United States Patent [19]
Blom et al.

[11] Patent Number: 5,534,753
[45] Date of Patent: Jul. 9, 1996

[54] HIGH-PRESSURE DISCHARGE LAMP IGNITING CIRCUIT IN WHICH THE VOLTAGE-RAISING NETWORK INCLUDES INDUCTORS

[75] Inventors: Anton C. Blom; Frans Slegers, both of Eindhoven, Netherlands

[73] Assignee: U.S. Philips Corporation, New York, N.Y.

[21] Appl. No.: 413,060

[22] Filed: Mar. 29, 1995

[30]     Foreign Application Priority Data

Apr. 6, 1994 [EP]  European Pat. Off. ............. 94200929

[51] Int. Cl.⁶ ................................................... H05B 37/00
[52] U.S. Cl. .................... 315/244; 315/200 R; 315/282; 315/227 R; 315/224; 315/307; 315/DIG. 5
[58] Field of Search ............................. 315/209 R, 200 R, 315/219, 220, 227 R, 224, 226, 282, 315, 307, DIG. 5, DIG. 7, 244, 283, 258, 356

[56]           References Cited

U.S. PATENT DOCUMENTS 3,849,716  11/1974  De Bergh et al. ........................ 321/2
4,471,269   9/1984  Ganser et al. ........................... 315/307
4,728,865   3/1988  Daniels ................................. 315/224 X
4,749,914   6/1988  Feher et al. ............................. 315/246
4,893,061   1/1990  Linssen ................................. 315/227 R
4,952,845   8/1990  Veldman ................................ 315/209 R
4,958,107   9/1990  Mattas et al. ................... 315/DIG. 5 X
5,084,655   1/1992  Van Zanten ............................. 315/290
5,087,859   2/1992  Blankers ............................. 315/209 R Primary Examiner—Robert Pascal
Assistant Examiner—Haissa Philogene
Attorney, Agent, or Firm—Edward Blocker

[57]           ABSTRACT

The invention relates to a circuit arrangement for igniting a high-pressure discharge lamp (L), provided with input terminals (C,D) for connection to a commutating supply source with a square-wave supply voltage; a pulse-generating circuit (IV) provided with a voltage-dependent breakdown element (3) and with a voltage-raising network (2) formed by a network of rectifiers and capacitors; a pulse transformer (1); and an electrical connection between a secondary winding (12) of the pulse transformer and lamp connection terminals (E,F). The voltage-raising network (2) is in addition provided with inductors means (21, 22). The result of this is that a strongly increased voltage is available across the breakdown element substantially instantaneously after each commutation of the commutating supply voltage.

7 Claims, 3 Drawing Sheets

HIGH-PRESSURE DISCHARGE LAMP IGNITING CIRCUIT IN WHICH THE VOLTAGE-RAISING NETWORK INCLUDES INDUCTORS

BACKGROUND OF THE INVENTION

1. Field of the Invention

The invention relates to a circuit arrangement for igniting a high-pressure discharge lamp, provided with
- input terminals for connection to a commutating supply source with a square-wave supply voltage;
- a pulse-generating circuit provided with a voltage-dependent breakdown element and with a voltage-raising network formed by rectifying and capacitive means;
- a pulse transformer; and
- an electrical connection between a secondary winding of the pulse transformer and lamp connection terminals.

2. Description of the Related Art

A circuit arrangement of the kind mentioned in the opening paragraph is known from EP-A-0 398 432 (U.S. Pat. No. 5,087,859). The known circuit arrangement forms part of a circuit for operating and igniting a high-pressure discharge lamp as part of a projection TV system. Special requirements as to dimensions and luminous efficacy are imposed of a lamp if it is to be suitable for such an application. This results in that an ignition pulse of more than 10 kV, often even more than 20 kV, is required for reliable ignition of the lamp. A further requirement imposed on the ignition circuit is that an extinguished lamp which has not or hardly cooled down must be capable of quick re-ignition. Such hot re-ignition requires a re-ignition pulse of a level corresponding to that of the ignition pulse.

In the known circuit arrangement, ignition pulse generation takes place through excitation of a tuned LC circuit by which the voltage across the capacitive means of the voltage-raising network is so increased that the breakdown voltage of the breakdown element is reached. The supply source voltage is commutated with a comparatively high frequency of a few tens of kHz to achieve an efficient operation during the process of ignition pulse generation. After the connected lamp has ignited and a stable arc discharge has developed, the commutation frequency of the supply voltage switches to a comparatively low value. By choosing a high commutation frequency in the ignition phase, it is indeed possible to use comparatively small components and the generation of a sufficiently high voltage will occupy comparatively little time. A disadvantage, however, is that the supply source circuit must be fitted with means for changing the commutation frequency in dependence on the state of the lamp.

SUMMARY OF THE INVENTION

It is an object of the invention to provide a circuit arrangement with which the generation of ignition pulses occupies comparatively little time also at a comparatively low commutation frequency of the supply voltage. According to the invention, a circuit arrangement of the kind mentioned in the opening paragraph is for this purpose characterized in that the voltage-raising network also comprises inductive means.

The use of inductive means in the voltage-raising network formed from rectifying and capacitive means has the advantageous result that, in the case of supply with the square-wave commutating supply voltage, a fourfold voltage compared with the supply voltage is available substantially instantaneously after each commutation, whereby breakdown of the voltage-dependent breakdown element is facilitated. It is thus possible to generate ignition pulses with a repetition frequency which is twice the commutation frequency with the use of a comparatively low commutation frequency. The above is true when the voltage-raising network including the inductive means has a full-wave action relative to the commutating supply voltage.

In the case of half-wave action, the voltage increase will be limited to double the supply voltage, and the ignition pulse generation will take place with the same frequency as the commutation frequency. The substantially instantaneous availability of the raised voltage also holds in this form of the circuit arrangement.

The disadvantage of the known circuit arrangement is eliminated thereby.

The measure according to the invention advantageously utilizes the response of an LC circuit to a leap-wise or step-wise voltage change.

The inductive means may be accommodated between input terminals and rectifying means of the voltage-raising network. It is also possible that the inductive means are accommodated between the rectifying means and the capacitive means of the voltage-raising network. In the latter case, rectifying means with a lower maximum admissible reverse voltage value can suffice.

It was found to be advantageous when additional inductive means are present between the secondary winding of the pulse transformer and at least one of the lamp connection terminals. This was found to be effective in counteracting the risk of semiconductor switching elements becoming defective during lamp breakdown where the additional inductive means were also included in the lamp operating circuit. The measure is particularly effective when the additional inductive means are provided symmetrically as regards their values relative to the lamp connection terminals.

To counteract the occurrence of interference fields caused by the pulse generation, it is advisable to construct the conductor extending from the secondary winding of the pulse transformer to one of the lamp connection terminals as a coaxial conductor. Preferably, the sheath of the coaxial conductor is in direct electrical contact with another one of the connection terminals. The value of the capacitance formed by the coaxial conductor is one of the determining factors for the shape of the ignition pulses generated.

BRIEF DESCRIPTION OF THE DRAWINGS

The above and further aspects of the invention will be described in more detail with reference to a drawing of an embodiment, in which.

DESCRIPTION OF THE PREFERRED EMBODIMENTS

Figure 1:
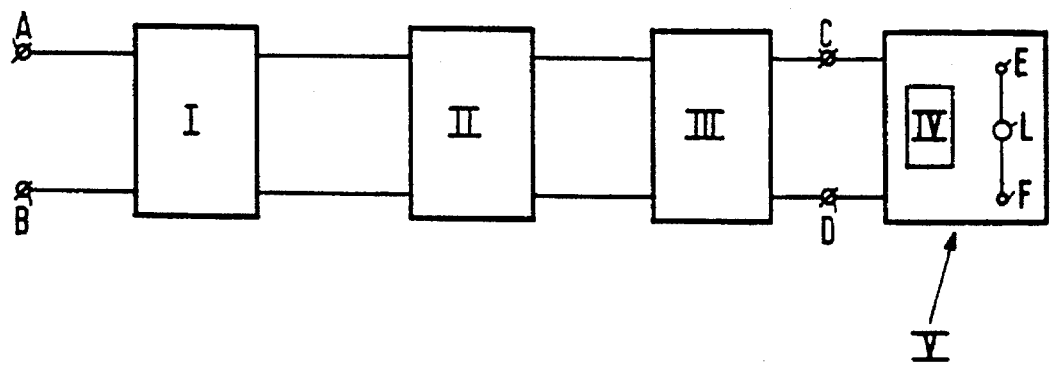
FIG. 1 is a diagram of a circuit for igniting and operating a high-pressure discharge lamp of a projection TV system.

In FIG. 1, A, B are connection terminals for connection to a supply voltage source, for example, a public mains of 220

V, 50 Hz. Rectification of the supply voltage takes place in I. Circuit I may also comprise provisions for preventing mains voltage pollution owing to the operation of the circuit arrangement.

Figure 2:
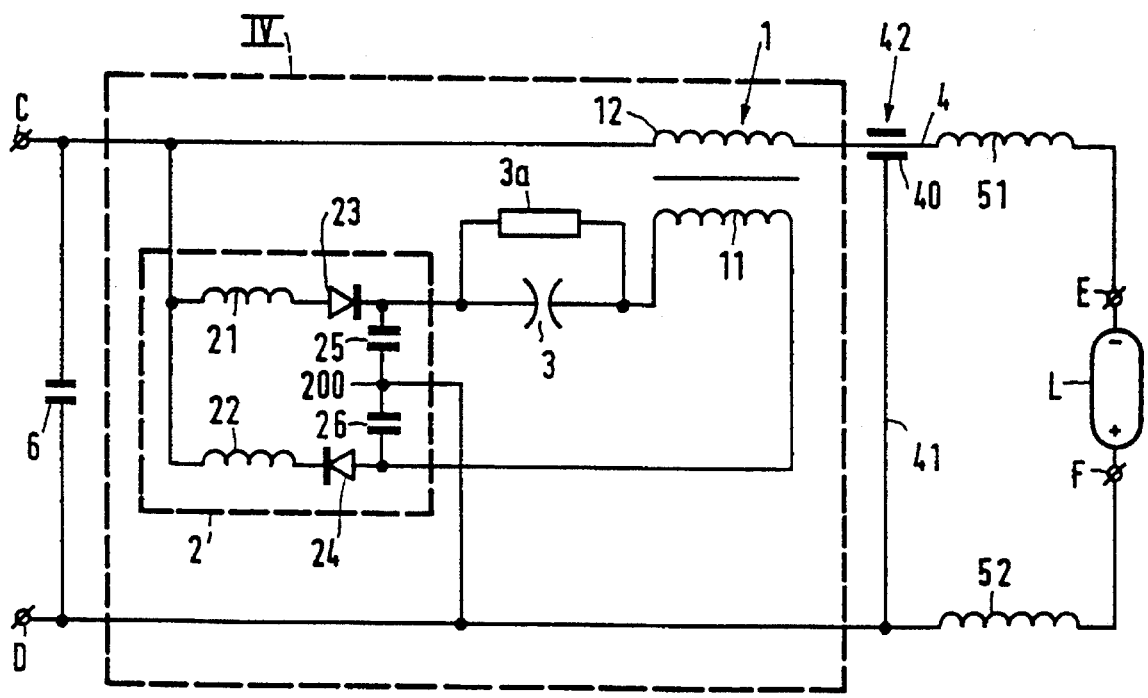
FIG. 2 shows a portion of the circuit of FIG. 1 in more detail, which portion is a circuit for igniting the high-pressure discharge lamp.
Figure 4:
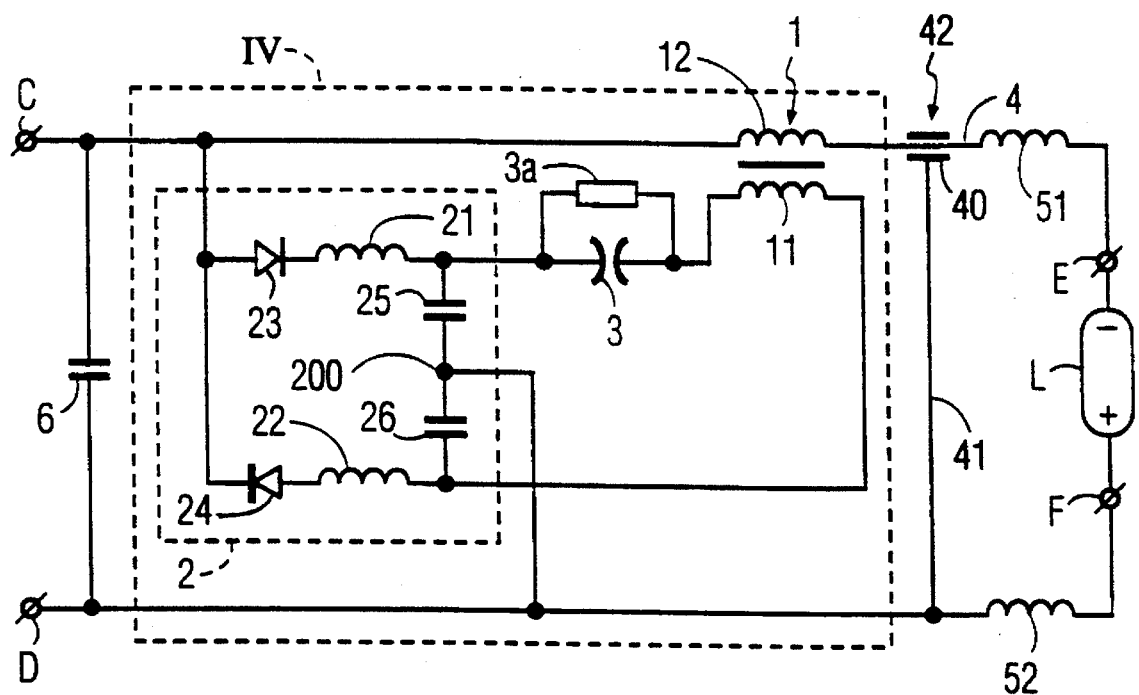
FIG. 4 shows an alternative construction of the circuit shown in FIG. 2.

Block II forms a switch mode power supply by which a commutator circuit III is supplied. The commutator circuit acts as a commutating supply source with a square-wave supply voltage. The commutator circuit III is connected to a lamp circuit V via input terminals C, D, which lamp circuit comprises a pulse generation circuit IV and lamp connection E, F between which a lamp L is connected. FIGS. 2 and 4 show alternative constructions for the lamp circuit V forming part of the overall circuit of FIG. 1. The only difference between FIG. 2 and FIG. 4 are that the series connected elements 21, 23 are reversed in position in FIG. 4 and that the series connected elements 22, 24 are also reversed in position in FIG. 4.

In FIGS. 2 and 4, input terminal C is connected to a pulse transformer 1. A primary winding 11 of the transformer 1 is connected in series with a voltage-dependent breakdown element 3 between input terminals C and D via a voltage-raising network 2. A secondary winding 12 of transformer 1 is connected at one side directly to input terminal C. At the other side, the secondary winding 12 is connected via a coaxial conductor 4 to a self-induction 51, which in its turn is connected to lamp connection terminal E, thus providing an electrical connection between the secondary winding of the pulse transformer and the lamp connection points. Sheath 40 of the coaxial conductor 4 is directly connected through a conductor 41 to input terminal D, and via a self-induction 52 to a lamp connection terminal F. The capacitance formed by the coaxial conductor is indicated with 42.

The voltage-raising network 2 of capacitive, inductive, and rectifying means comprises a first circuit with a self-inductance 21 and a diode 23 connected in series, these series connected elements being connected at one side to input terminal C and at another side to the voltage-dependent breakdown element 3. The network also comprises a second circuit comprising a self-inductance 22 and a diode 24 connected in series, these series connected elements being connected at one side to input terminal C and at another side to the secondary winding 11 of the pulse transformer 1. In FIG. 2, the two diodes 23, 24 are interconnected by a series arrangement of two capacitors 25, 26, of which a common junction 200 is connected to input terminal D. In FIG. 4, the two self-inductances 21, 22 are interconnected instead by the series arrangement of the two capacitors 25, 26, and the common junction 200 is connected in input terminal D.

Transformer 1, voltage-raising network 2 and voltage-dependent breakdown element 3, shunted by a leakage resistance 3a, together form a pulse-generating circuit IV. The self-inductances 51 and 52 form additional inductive means which together with capacitance 42 and secondary winding 12 constitute a filter of which also the lamp connection terminals E and F form part. The tuning of the filter is so chosen in relation to the natural frequency of the pulse-generating circuit that the combination forms a bandpass filter.

In a practical realisation of an embodiment as described above, the circuit arrangement is suitable for igniting and operating a 100 W Philips high-pressure mercury lamp of the CSL-R type. The rated lamp voltage is 90 V, the rated lamp current frequency is 90 Hz.

Sub-circuits I and II are an input filter combined with a rectifier bridge and an up-converter combined with a down-converter, respectively, as known from Philips electronic ballast type EMC 150.

The commutator circuit III is constructed as a bridge circuit, also in accordance with said Philips electronic ballast type EMC 150. The commutator supplies a no-load square-wave supply voltage of approximately 300 V when a supply source of 220 V is connected to terminals A, B.

Figure 3:
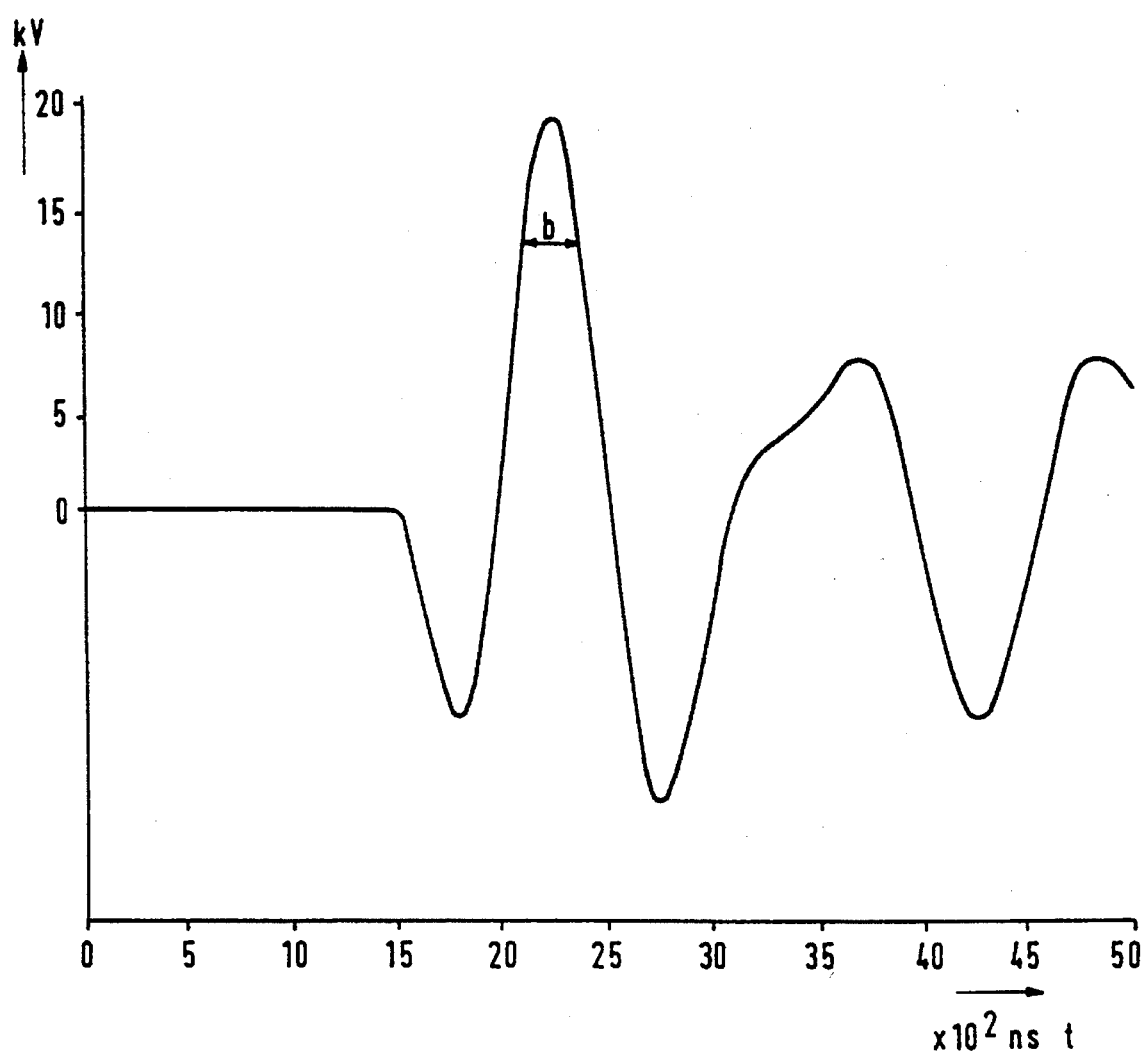
FIG. 3 shows a voltage generated by the circuit arrangement of FIG. 1.

The two self-inductances 21,22 of the voltage-raising network in the embodiment described are wound on a shared ferrite core and ensure together with capacitors 25, 26 that the no-load voltage of approximately 300 V is amplified to approximately 1100 V. It is alternatively possible, however, for the two self-inductances 21,22 of the voltage-raising network to be constructed as separate elements, each with its own ferrite core. The voltage-dependent breakdown element is a spark gap, make Siemens, with a breakdown voltage of 800 V which is shunted by a leakage resistance $3a$ of 33 kohms for a good operation of the voltage-raising network. This in fact achieves that the voltage across the capacitor of the network is well defined. This shunt resistor is also desirable for reasons of handling safety. Also for safety reasons, the connection between the capacitors of the voltage-raising network and input terminal D includes a PTC resistor (not shown). To counteract interference, a decoupling capacitor 6 of 1 nF is connected between the connection terminals C and D. The capacitors 25, 26 each have a value of 68 nF, the self-inductances 21, 22 each of 24 mH. The pulse transformer is a high-voltage transformer with a ferrite rod core, a primary winding of 4 turns, and a secondary winding comprising 11 sections of 14 turns each. The primary winding and the secondary winding are both formed from wire of 400 μm diameter. The coupling between primary and secondary windings here is 0.5. The transformer supplies an ignition pulse of at least 15 kV and at most 25 kV. The pulse thus generated has a width of approximately 300 ns measured at 13.5 kV. The additional inductive means, consisting of two self-inductances 51, 52, are formed from wire of 0.8 mm as a single layer of 45 turns on a ferrite rod core. Each self-inductance has a value of 54 μH. FIG. 3 shows a waveform of a generated ignition pulse. Time t is plotted on the horizontal axis in units of 500 ns per graduation. Voltage V is plotted on the vertical axis in units of 5 kV per graduation.

It is visible from the Figure that the generated pulse has a width b of 300 ns at a voltage level of 13.5 kV.

We claim:

1. A circuit arrangement for igniting a high-pressure discharge lamp, provided with input terminals for connection to a commutating supply source with a square-wave supply voltage;

a pulse-generating circuit provided with a voltage-dependent breakdown element and with a voltage-raising network formed by rectifying and capacitive means;

a pulse transformer having a primary winding connected between the voltage-dependent breakdown element and the voltage-raising network; and an electrical connection between a secondary winding of the pulse transformer and lamp connection terminals, characterized in that the voltage-raising network itself also comprises inductive means in addition to the pulse transformer connected to the voltage-raising network.

2. A circuit arrangement for igniting a high-pressure discharge lamp, provided with input terminals for connection to a commutating supply source with a square-wave supply voltage;

a pulse-generating circuit provided with a voltage-dependent breakdown element and with a voltage-raising network formed by rectifying and capacitive means;

a pulse transformer; and an electrical connection between a secondary winding of the pulse transformer and lamp connection terminals, characterized in that the voltage-raising network also comprises inductive means and in that the inductive means are accommodated between one of the input terminals and the rectifying means of the voltage-raising network.

3. A circuit arrangement as claimed in claim 2 wherein the electrical connection between the secondary winding of the pulse transformer and the lamp connection terminals includes additional inductive means.

4. A circuit arrangement as claimed in claim 2 wherein a coaxial conductor is used to form at least a portion of the electrical connection between the secondary winding of the pulse transformer and one of the lamp connection terminals and the sheath of the coaxial conductor is connected to another one of the lamp connection terminals.

5. A circuit arrangement for igniting a high-pressure discharge lamp, provided with input terminals for connection to a commutating supply source with a square-wave supply voltage;

pulse-generating circuit provided with a voltage-dependent breakdown element and with a voltage-raising network formed by rectifying and capacitive means;

a pulse transformer; and an electrical connection between a secondary winding of the pulse transformer and lamp connection terminals, characterized in that the voltage-raising network also comprises inductive means and in that the inductive means are accommodated between the rectifying means and the capacitive means of the voltage-raising network.

6. A circuit arrangement as claimed in claim 5 wherein the electrical connection between the secondary winding of the pulse transformer and the lamp connection terminals includes additional inductive means.

7. A circuit arrangement as claimed in claim 5 wherein a coaxial conductor is used to form at least a portion of the electrical connection between the secondary winding of the pulse transformer and one of the lamp connection terminals and the sheath of the coaxial conductor is connected to another one of the lamp connection terminals.

* * * * *